April 21, 1931. M. M. SUPPES 1,802,095
HEATING APPARATUS
Filed Dec. 24, 1928 2 Sheets-Sheet 1
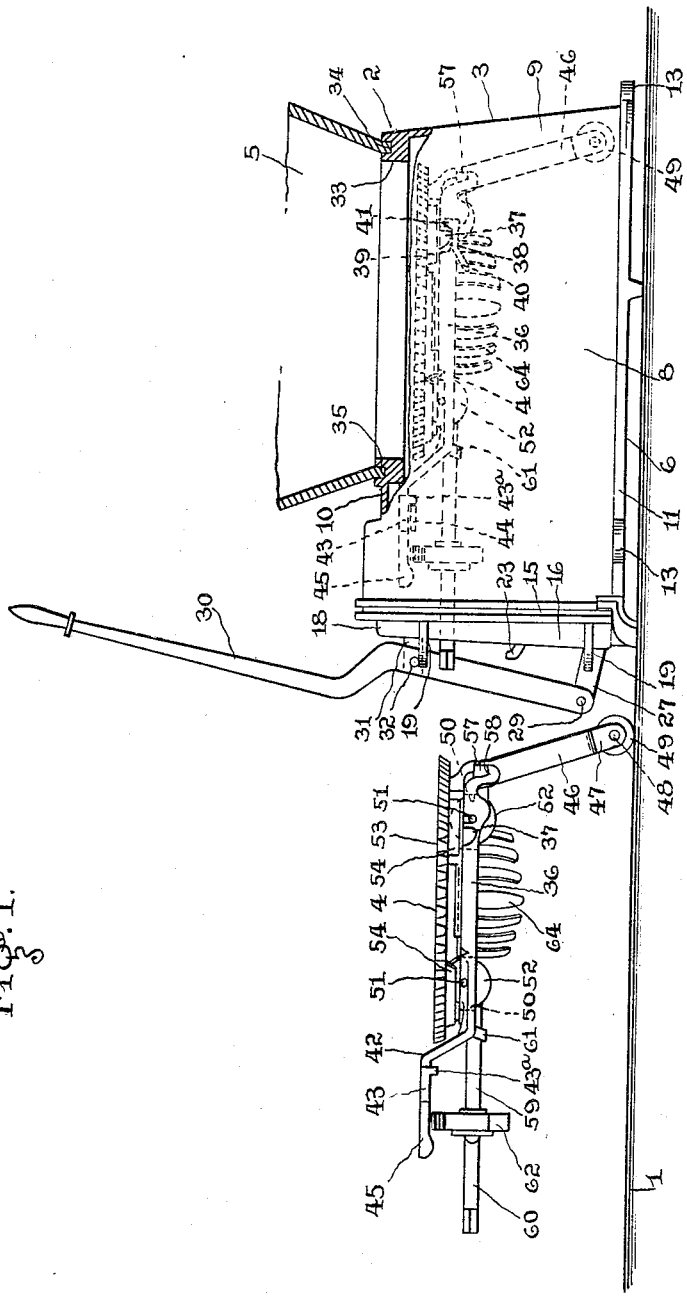
Inventor
Max M. Suppes
By his Attorney

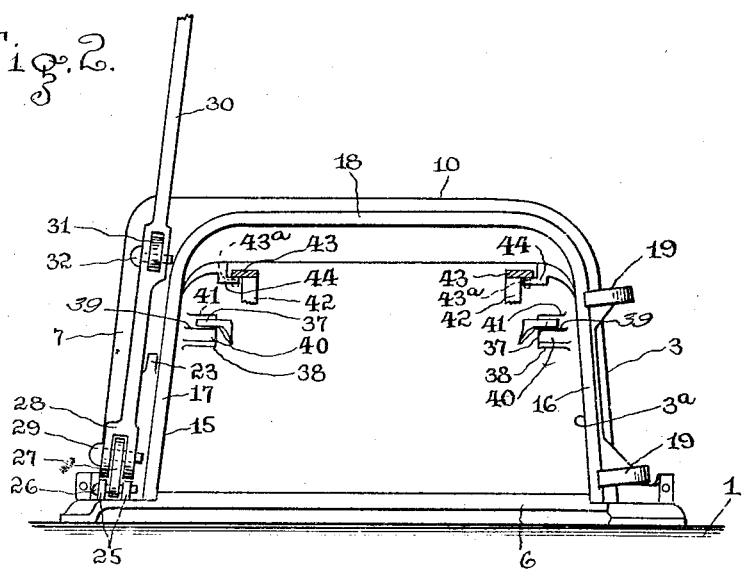
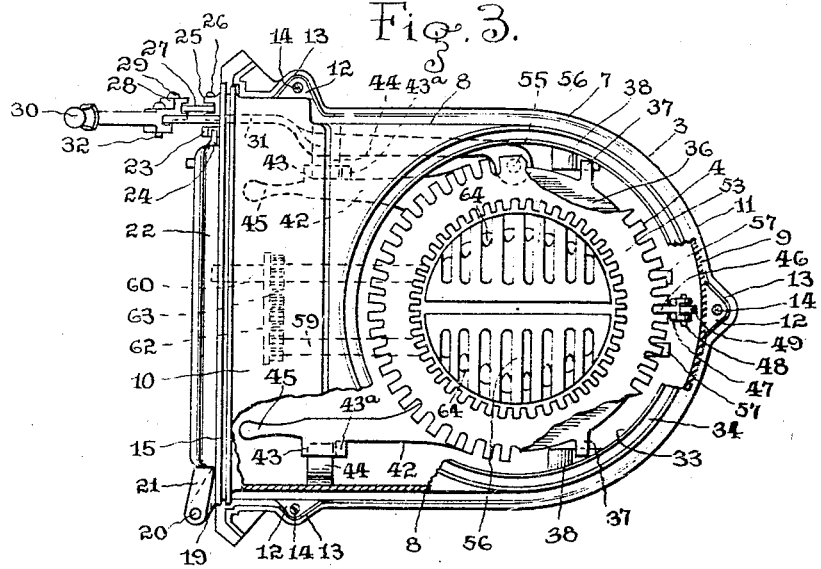

Patented Apr. 21, 1931

1,802,095

UNITED STATES PATENT OFFICE

MAX M. SUPPES, OF ELYRIA, OHIO, ASSIGNOR TO THE FOX FURNACE COMPANY, OF ELYRIA, OHIO, A CORPORATION OF OHIO

HEATING APPARATUS

Application filed December 24, 1928. Serial No. 328,176.

My invention relates to new and useful improvements in heating apparatus, and more particularly to a fuel supporting grate.

An object of my invention is to provide a grate member which may be inserted in and removed from a heating apparatus with facility.

Another object is to provide means to position and support the grate member in operative relation to the fire-pot as the grate member is moved into the heating apparatus.

The invention consists in the improved construction and combination of parts, to be more fully described hereinafter, and the novelty of which will be particularly pointed out and distinctly claimed.

In the accompanying drawings to be taken as a part of this specification, I have fully and clearly illustrated a preferred embodiment of my invention, in which drawings—

Figure 1 is a view in side elevation, partially in central section, of a part of a heating apparatus embodying my invention, and showing the grate member in full lines outside of the ash-pit casing and in dotted lines within the ash-pit casing in operative position;

Fig. 2 is a view in front elevation of the ash-pit casing with the ash-pit door removed, and showing the cooperative relation between the grate supports and the grate member, and Fig. 3 is a top plan view of the ash-pit casing, certain parts being broken away and showing the grate member in operative position in the casing.

Referring to the drawings by characters of reference, 1 designates a floor, or the like, on which my heating apparatus, indicated generally at 2, rests. For the purpose of illustrating my invention, I have shown only that portion of a heating apparatus comprising an ash-pit casing 3, a grate member 4, and a fire-pot 5, which is necessary to enable those skilled in the art to understand my invention. The casing 3 has a flat base member 6 which forms the floor of the casing and which is preferably oblong, having the front end rectangular and the rear end substantially semicircular. Closing the sides and rear but leaving the front of the casing 3 open, as at 3ª, is a side wall 7 which converges slightly upward, as is apparent from Figs. 1 and 2. The side wall 7 preferably comprises substantially straight opposed side portions 8, which are joined by a rear or end curved portion 9 which is substantially semi-circular in horizontal cross-section. The top of the casing 3 is closed by a substantially horizontal top wall 10 which is substantially similar in plan view to the base member 6, and which is joined at its periphery to the top edge of the wall 7. The side wall 7 and the top wall 10 are preferably formed as a single unit, as by casting, or the like, though it is of course apparent that they may be separate members rigidly secured together. The wall 7 seats on the base member 6 and is confined against lateral or rearward movement by a substantially vertical, peripheral flange or rib 11 on the member 6. At the bottom edge of the wall 7 are substantially horizontal outwardly projecting lugs 12 which overlie similar lugs 13 on the base member 6 to which the lugs 12 are secured, as by bolts 14, or the like. The open front of the casing 3 is provided with a door or closure member supporting frame 15 which rests upon the base member 6 and comprises, substantially flush with the front edge thereof, upright side members 16, 17 and a substantially horizontal top member 18 which abut and are secured respectively to the side portions 8 and the top wall 10. Projecting laterally and slightly forward from the member 16 are vertically spaced rigid hinge arms 19, to which are pivoted by pivot pins 20 hinge arms 21 which carry or support a door or closure member 22. Projecting forwardly from the side member 17 is a catch 23 which cooperates with a latch member 24 on the door 22, as in Fig. 3, to maintain the door in closed engagement with the frame 15 and base 6. Near the lower end of the member 17 are horizontally spaced lugs 25 through which extends a pivot pin 26 on which is journaled between the lugs 25, one end of a link 27. The other end of the link 27 is straddled by a yoke 28 which is pivoted thereon by a pin 29, and which is formed on the lower end of a shaker lever 30. Reciprocable through an aperture in the side member 17 and adjacent the horizontal member 18, is a shaker bar 31, the outer end of which is positioned in an opening through the lever 30 and is pivoted therein on a pin 32 passed through the lever 30. The top wall 10 of the casing 3 has at its rear a substantially circular opening 33 therethrough, which is substantially concentric with the arcuate end wall 9. Surrounding the opening 33 is a groove 34 formed in the outside face of the top wall 10 and in which the substantially circular edge 35 of the fire-pot 5 seats.

Within the casing 3 and directly beneath the opening 33 to close the bottom of the fire-pot 5 is the grate member 4. This member 4 comprises an annular frame member 36 from the outer circumference of which project, adjacent its rear or inner end, lateral extending lugs 37 which seat respectively on supporting members 38 extending substantially horizontally into the casing 3 from the wall 7 at the rear of the casing. Each of the members 38 comprises a substantially horizontal part or platform 39 on which the lugs 37 normally rest when the grate member 4 is in operative position, and an inclined guide or ramp 40 which extends forward and downward from the part 39 toward the opening $3^a$. At the rear of the part 39 is an upward projecting part 41 which by engagement with the lugs 37 prevents further movement of the member 4 into casing 3. Also projecting from the member 36 are arm or hand-grasp members 42 which are substantially parallel and extend from the sides of member 36 forward toward the opening $3^a$ adjacent, respectively, the side wall portions 8. Extending laterally from the members 42 are flanges 43 which normally seat, respectively, on supporting members 44 which extend inwardly from the casing side portions 8 adjacent the top wall 10 and in front of the opening 33. Depending from the rear edge of each flange 43 is a lug or locking member $43^a$, one of which engages behind each of the supporting members 44 to prevent substantially horizontal outward movement of the grate member 4 toward the opening $3^a$. At the free end of each arm member 42 is a hand grip 45. Depending from the rearmost part of member 36 is a leg or supporting member 46 which preferably terminates at its free end in a yoke 47. Journaled between the arms of the yoke 47 on a bearing pin 48 passed therethrough is a roller or wheel 49. The length of the leg member 46 is such that when the grate member 4 is in operative position within the casing 3, the roller 49 is suspended above the floor 6, but also such that when the roller 49 rides on the floor 6 the lugs 37 will be in position to ride upon their respective ramps 40. Through the member 36 are a plurality of equally spaced vertical slots 50, preferably four in number, in which are positioned for rotation on horizontal pins 51, bearing rollers 52. Supported on the rollers 52 is a great ring 53 having depending flanges 54 which prevent lateral displacement of the ring 53 relative to the rollers 52. Also depending from the ring 53 is a pin 55 which passes through an aperture in the inner or rear end of the shaker bar 30, and to which the bar is secured in any suitable manner, as by passing a cotter-pin (not shown) through pin 55 beneath the bar 30. Within the ring 53 and closing the open center thereof, are a pair of substantially semi-circular grate elements 56 from which project substantially parallel, rearwardly extending bearing pins 57 which are journaled in horizontal bearing openings 58 adjacent the leg member 46 and in the member 36. Alined with the pins 57 and projecting forwardly from the elements 56 are operating bars or rods 59, 60 which are supported in a bearing block member 61 fixed to the member 36. Mounted rigidly on the free end of the rod 59 which terminates within the casing 3 is a gear member 62 which meshes with a gear member 63 rigid on the rod 60 which extends to the opening $3^a$.

When the grate member 4 is operatively positioned within the casing 3, reciprocation of the shaker lever 30 toward and from the casing 3 will reciprocate the bar 31, thereby oscillating the ring 53 in a horizontal plane on its bearing rollers 52. If the rod 60 is oscillated, as by a shaker crank or lever, not shown, the elements 56 will be rocked in a vertical plane toward and from each other. The elements 56 are preferably provided with depending grate fingers 64 which rise into the space between the elements 56 and the ring 53 when the elements 56 are swung upward toward each other, thereby to prevent dumping of the fuel supported on the grate member 4 into the ash-pit casing.

Should it be desired to remove the grate member 4 from the casing 3, this is accomplished as follows: The shaker bar 31 is released from the member 4 and the handgrips 45 are grasped by the operator and the forward end of the member 4 is lifted until the lugs $43^a$ clear the supporting members 44. This may be done easily as the grate member 4 will be pivotally supported at its rear by the lugs 37 turning on the supporting members 38. When the lugs $43^a$ have been so lifted, the grate member 4 may be pulled forward and the lugs 37 will ride or slide down the ramps 40 until the roller 49 engages the floor 6. When the flanges 43 have been displaced from their positions over the members 44, then the arm members 42 may be lowered through or between the members 44. The member 4 may then be rolled out of the casing 3, supported at its forward end by the operator, who has hold of the hand-grasp members 45, and supported at its inner or rear end by the leg member 46. The grate member 4 may be placed within the casing 3 in operative position beneath the fire-pot 5 with equal facility, the operation being as follows: The hand-grips 45 are grasped by the operator and the member 4 is rolled or slid into the casing 3, the roller 49 riding on the floor 6. As the lugs 37 are about to engage the ramps 40, the arm members 42 are raised by the operator between the members 44 to permit the lugs 43ª to pass over the supporting members 44. The member 4 is then pushed further into the casing and now the lugs 37 will ride up the ramps 40, lifting the grate member 4 to operative position and the roller 49 from the floor 6. When the member 4 has been pushed into the casing to its operative position, the lugs 37 will engage the upward projecting parts 41 of members 38 and stop further rearward movement of member 4, and the lugs 37 will be positioned on the platforms 39. The arm members 42 are then lowered by the operator and the flanges 43 will rest upon the supporting members 44, with the lugs 43ª falling behind the members 44. The lugs 37 and flanges 43 provide a four-point suspension for the grate member 4 which prevents any lateral or endwise tipping thereof.

What I claim and desire to secure by Letters Patent of the United States is:

1. A heating apparatus comprising an ash-pit casing having a grate opening in its top wall and an opening in its side wall, a grate member adapted to be positioned within said casing and beneath said grate opening to support a bed of fuel, said grate member having means to support said grate member for movement through said side wall opening into and out of said casing, and cooperating means on said grate member and said casing to support said grate member in fuel supporting position beneath said opening.

2. A heating apparatus comprising an ash-pit casing having a grate opening in its top wall and an opening in its side wall, a grate member adapted to be positioned within said casing and beneath said grate opening to support a bed of fuel, said grate member having means to support said grate member for movement through said side wall opening into and out of said casing, and cooperating means on said grate member and said casing to lift said grate member into and support said grate member in fuel supporting position beneath said opening.

3. A heating apparatus comprising an ash-pit casing having a grate opening in its top wall and an opening in its side wall, a grate member adapted to be positioned within said casing and beneath said grate opening to support a bed of fuel, said grate member having a depending leg to support said grate member for movement through said side wall opening into and out of said casing, and cooperating means on said grate member and said casing to support said grate member in fuel supporting position beneath said opening.

4. A heating apparatus comprising an ash-pit casing having a side wall with an opening therethrough, a grate member, means to support said grate member for movement through said opening into and out of said casing, supporting means within said casing and extending from said side wall, and means on said grate member cooperating with said second-named supporting means to support said grate member in said casing.

5. A heating apparatus comprising an ash-pit casing having a side wall with an opening therethrough, a grate member, means to support said grate member for movement through said opening into and out of said casing, supporting means within said casing and extending from said side wall adjacent the front and the rear of said casing, and means on said grate member cooperating with said second-named supporting means to support said grate member in said casing.

6. A heating apparatus comprising an ash-pit casing having a side wall with an opening therethrough, a grate member, means to support said grate member for movement through said opening into and out of said casing, supporting means within said casing and extending from said side wall, means on said grate member engaging said second-named supporting means to support said grate member in said casing, and means to prevent disengagement of said last-named means and said second-named supporting means.

7. A heating apparatus comprising an ash-pit casing having an opening in its side wall, a grate member having a depending supporting member at its rear and hand-grasp means at its front whereby said grate member may be moved in elevated position through said opening and into said casing, and means in said casing cooperable with said grate member to receive and support said grate member in operative position in said casing upon movement of said grate member into said casing.

8. A heating apparatus comprising an ash-pit casing having an opening in its side well, a grate member having a depending supporting member at its rear and hand-grasp means at its front whereby said grate member may be moved in elevated position through said opening and into said casing, and means in said casing cooperable with said hand-grasp means to support the front of said grate member in said casing.

9. A heating apparatus comprising an ash-pit casing having an opening in its side wall, a grate member having a depending supporting member at its rear and hand-grasp means at its front whereby said grate member may be moved in elevated position through said opening and into said casing, means in said casing cooperable with said hand-grasp means to support the front of said grate member in said casing, and means to prevent disengagement of said hand-grasp means and said last-named means.

10. A heating apparatus comprising an ash-pit casing having a side wall with an opening therethrough, oppositely disposed supporting members carried by said wall at the rear of and within said casing, oppositely disposed supporting members carried by said wall at the front of and within said casing, a grate member having means resting upon said rear supporting members and having means resting upon said front supporting members whereby said grate member is operatively positioned in said casing, and supporting means depending from the rear of said grate member whereby said grate member may be slid from said rear supporting members to rest upon said supporting means for withdrawal through said opening and from said casing.

11. A heating apparatus comprising an ash-pit casing having a side wall with an opening therethrough, oppositely disposed supporting members carried by said wall at the rear of and within said casing, oppositely disposed supporting members carried by said wall at the front of and within said casing, a grate member having means resting upon said rear supporting members and having means resting upon said front supporting members whereby said grate member is opertively positioned in said casing, supporting means depending from the rear of said grate member whereby said grate member may be slid from said rear supporting members to rest upon said supporting means for withdrawal through said opening and from said casing, and means to hold said grate member on said supporting members.

12. A heating apparatus comprising an ash-pit casing having a side wall with an opening therethrough, oppositely disposed supporting members carried by said wall at the rear of and within said casing, said members having downward and forward inclined portions, oppositely disposed supporting members carried by said wall at the front of and within said casing, means on said grate member cooperable with said rear supporting members, a supporting leg for said grate member of such height that said means will engage said inclined portions whereby movement of said grate member through said opening and into said casing will lift said grate member and said means onto said rear supporting members to support the rear of said grate member, and means on said grate member to engage said front supporting members to support the front of said grate member.

13. A heating apparatus comprising an ash-pit casing having a side wall with an opening therethrough, oppositely disposed supporting members carried by said wall at the rear of and within said casing, said members having downward and forward inclined portions, oppositely disposed supporting members carried by said wall at the front of and within said casing, means on said grate member cooperable with said rear supporting members, a supporting leg for said grate member of such height that said means will engage said inclined portions whereby movement of said grate member through said opening and into said casing will lift said grate member and said means onto said rear supporting members to support the rear of said grate member, means on said grate member to engage said front supporting members to support the front of said grate member, and means to prevent outward movement of said grate member.

14. A heating apparatus comprising an ash-pit casing having a side wall with an opening therethrough, oppositely disposed supporting members carried by said wall at the rear of and within said casing, said members having downward and forward inclined portions, oppositely disposed supporting members carried by said wall at the front of and within said casing, means on said grate member cooperable with said rear supporting members, a supporting leg for said grate member of such height that said means will engage said inclined portions whereby movement of said grate member through said opening and into said casing will lift said grate member and said means onto said rear supporting members to support the rear of said grate member, and hand-grasp members on said grate member adapted to be grasped by an operator for moving said grate member through said opening and into said casing on said supporting leg, said hand-grasp members cooperating with said front supporting members to support said grate member in said casing.

15. A heating apparatus comprising an ash-pit casing having a side wall with an opening therethrough, oppositely disposed supporting members carried by said wall at the rear of and within said casing, said members having downward and forward inclined portions, oppositely disposed supporting members carried by said wall at the front of and within said casing, means on said grate member cooperable with said rear supporting members, a supporting leg for said grate member of such height that said means will engage said inclined portions whereby movement of said grate member through said opening and into said casing will lift said grate member and said means onto said rear supporting members to support the rear of said grate member, hand-grasp members on said grate member adapted to be grasped by an operator for moving said grate member through said opening and into said casing on said supporting leg, said hand-grasp members cooperating with said front supporting members to support said grate member in said casing, and means on said hand-grasp members engaging said front supporting members to prevent substantially horizontal withdrawal of said grate member through said opening and from said casing.

16. A heating apparatus comprising an ash-pit casing having a side wall with an opening therethrough, oppositely disposed supporting members projecting from said side wall at the rear of and within said casing, oppositely disposed supporting members projecting from said side wall at the front of and within said casing, a grate member havings lugs extending laterally therefrom into overlying engagement with said rear supporting members to support the rear of said grate member, arm members extending forwardly from said grate members, lateral flanges on said arm members in overlying engagement with said front supporting members to support the front of said grate member, and a supporting leg depending from the rear of said grate member whereby an operator by grasping said arm members may withdraw said grate member on its supporting leg through said opening and from said casing.

17. A heating apparatus comprising an ash-pit casing having a side wall with an opening therethrough, oppositely disposed supporting members projecting from said side wall at the rear of and within said casing, oppositely disposed supporting members projecting from said side wall at the front of and within said casing, a grate member having lugs extending laterally therefrom into overlying engagement with said rear supporting members to support the rear of said grate member, arm members extending forwardly from said grate members, lateral flanges on said arm members in overlying engagement with said front supporting members to support the front of said grate member, a supporting leg depending from the rear of said grate member whereby an operator by grasping said arm members may withdraw said grate member on its supporting leg through said opening and from said casing, and means to prevent substantially horizontal disengagement of said flanges and said front supporting members.

18. A heating apparatus comprising a casing having side walls, an ash-pit determined by said casing, an opening in said casing, oppositely disposed rear supporting members within said ash-pit and carried by said walls, said members having downwardly and forwardly inclined portions, oppositely disposed front supporting members within said ash-pit and carried by said walls, a grate member having a supporting leg and capable of movement on said leg into and out of said ash-pit through said opening, said grate member having means cooperable with said rear supporting members, said leg being of such height that said means will engage said inclined portions of said rear supporting members upon movement of the grate member into said ash-pit and upon further rearward movement will lift said means up on said rear supporting members thereby raising said grate member, and hand-grasp members at the front of said grate member, said hand-grasp members having means for cooperating with said front supporting members to support said grate member in operable position.

In testimony whereof I have hereunto subscribed my name.

MAX M. SUPPES.